Nov. 11, 1952 C. C. CUTLER 2,617,930

REGENERATIVE PULSE GENERATOR

Filed Sept. 30, 1949 4 Sheets-Sheet 1

INVENTOR
C. C. CUTLER
BY George C. Lord
ATTORNEY

INVENTOR
C. C. CUTLER
BY Geo. C. Ford
ATTORNEY

INVENTOR
C. C. CUTLER
BY
ATTORNEY

Nov. 11, 1952 C. C. CUTLER 2,617,930

REGENERATIVE PULSE GENERATOR

Filed Sept. 30, 1949 4 Sheets-Sheet 4

INVENTOR
C. C. CUTLER
BY George C. Lord
ATTORNEY

Patented Nov. 11, 1952

2,617,930

UNITED STATES PATENT OFFICE 2,617,930

REGENERATIVE PULSE GENERATOR

Cassius C. Cutler, Gillette, N. J., assignor to Bell Telephone Laboratories, Incorporated, New York, N. Y., a corporation of New York Application September 30, 1949, Serial No. 118,889

12 Claims. (Cl. 250—27)

This invention relates to pulse generators and more particularly to regenerative pulse generating circuits.

Circulating pulse circuits wherein a pulse is applied to a loop circuit including an amplifier and a time delay device which introduces a delay equal to a desired pulse interval have been used for testing purposes and in certain forms of computing apparatus for the storage of information. In such circuits, the object is to provide a system wherein a pulse may circulate indefinitely under equilibrium conditions and from which the pulse may be abstracted after any desired number of circuit traversals.

Theoretically, the desired objects might be obtained by providing a loop circuit capable of transmitting an extremely wide band of frequencies without introducing any loss, phase distortion or non-linear amplitude effects. Were all these conditions to be fulfilled, a pulse once introduced in the circuit would circulate indefinitely without distortion or degradation of any sort. Such a theoretical circuit cannot be constructed because the requirement of zero loss necessitates the use of amplification and because the indefinite recirculation of pulses through the necessary amplifying circuit necessarily accentuates any slight imperfection to such an extent as ultimately to cause failure.

It is the object of the present invention, therefore, to provide a circulating pulse circuit wherein the cumulative effects of imperfections due to the transmission characteristics of the circuit may be eliminated, thereby to permit indefinite recirculation of pulses.

In accordance with the invention, the difficulties now encountered in circulating pulse circuits are overcome by providing a regenerative circuit wherein pulses which may become distorted upon repeated passages around the loop are regenerated for subsequent circulation in the circuit. This is accomplished by providing a controlled distortion which is complementary to distortions resulting from imperfections of the circulating pulse path. The compensating distortion required to overcome the pulse lengthening due to amplitude and phase distortions in the circulating pulse path, may be produced by a circuit non-linearity which operates to increase large amplitude signals and to decrease low amplitude signals. Conveniently and in accordance with the present invention, such a compensating distortion is provided by the use of an expander circuit. The circulating pulse generator of the invention includes an amplifier having a feedback circuit which introduces a delay equal to the interpulse interval at the desired repetition rate of the pulse series to be generated. The feedback circuit also includes an expander arranged to compensate for the natural frequency characteristics of the remaining elements of the circuit and an automatic gain control circuit is provided to maintain an over-all gain of unity at the desired peak pulse amplitude.

The regenerative pulse generators of the invention may be arranged for operation in synchronism with signals from external sources, if desired, and such synchronization may be accomplished without the addition of additional apparatus. It is further to be understood that recirculated pulse circuits according to the invention may be constructed for the circulation and regeneration of low frequency or direct current pulses, or for so-called radio frequency pulses which comprise bursts of radio frequency energy having the same envelope as the above-mentioned direct current pulses.

The above and other features of the invention will be described in detail in the accompanying specification taken in connection with the drawings in which.

Figure 4:
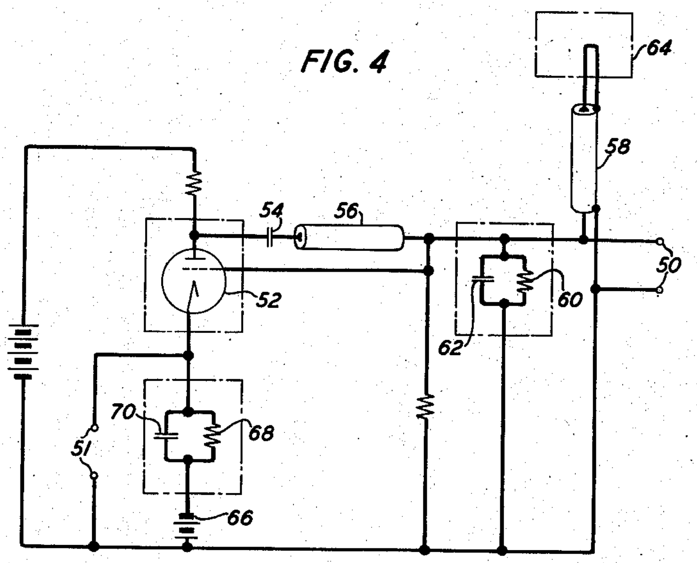
Fig. 4 is a schematic circuit diagram of a modified regenerative pulse generator wherein the feedback is accomplished by reflection of the pulses in a terminated delay line.
Figure 5:
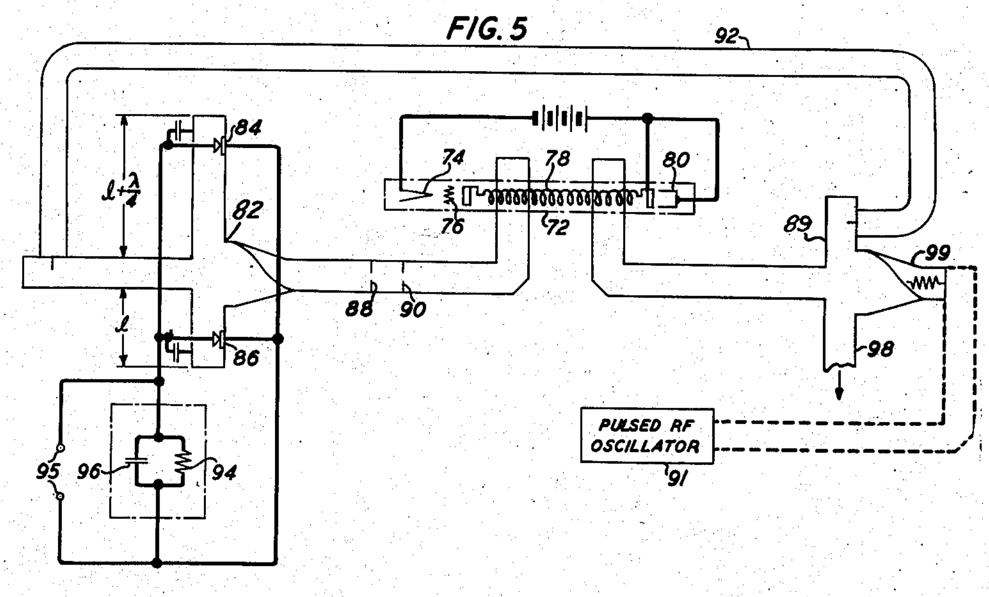
Fig. 5 is a schematic diagram corresponding to Fig. 1 and illustrating a circulating pulse generator for use at high radio frequencies.
Figure 6A:
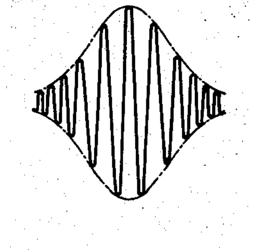
Figure 6B:
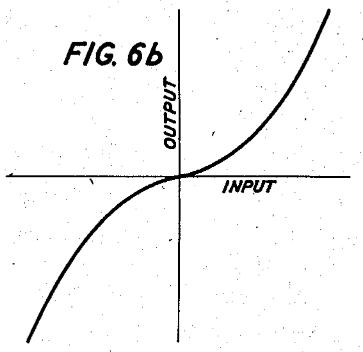
Figure 6C:
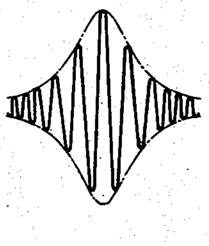
Figure 6D:
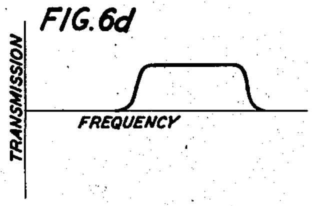
Figure 6E:
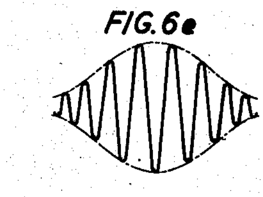
Figure 7:
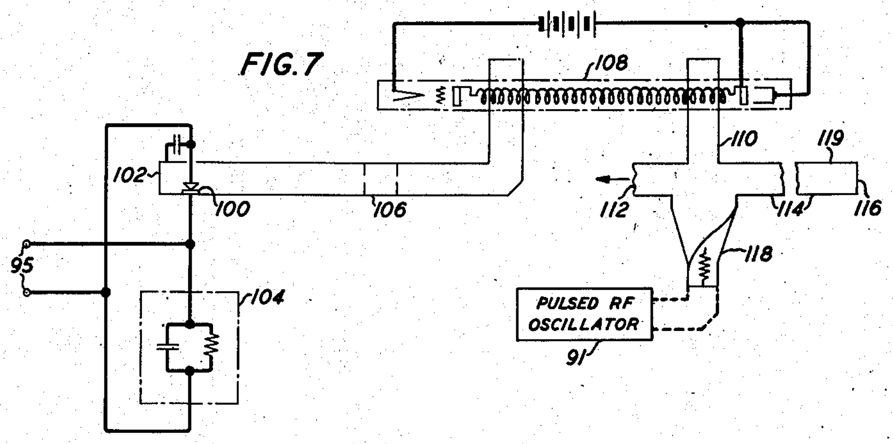

Figs. 6*a* through 6*d* are curves explanatory of the operation of the circuit of Fig. 5;

Fig. 7 is a schematic diagram of a regenerative pulse generator for radio frequency operation corresponding to the circuit of Fig. 4; and Figs. 8*a* through 8*c* and Figs. 9*a* through 9*d* are curves illustrative of the manner in which synchronization of the circulating pulse generator of the invention may be accomplished.

Figure 1:
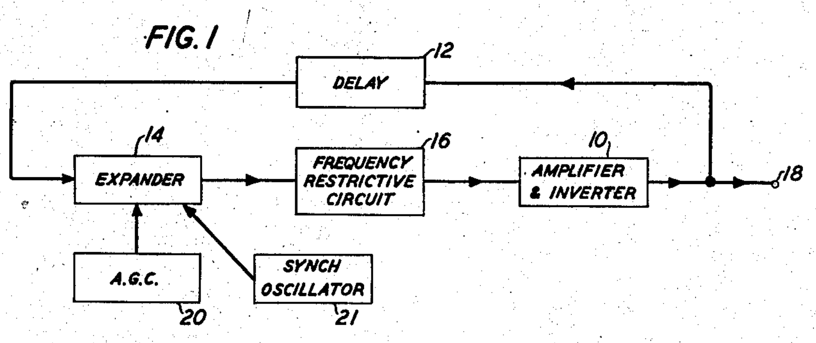
Fig. 1 is a block diagram of a regenerative pulse generator according to the invention.

Fig. 1 illustrates the basic regenerative pulse generator of the invention and the various elements included in the feedback loop circuit are indicated separately. It will be understood, however, that certain of these elements may be combined and that some of them, as for example the delay introduced by the loop circuit may be distributed throughout the circuit. The loop circuit of Fig. 1 includes an amplifier and phase inverter 10 the output of which is applied through a delay unit 12, expander 14 and a frequency restrictive circuit 16 to the input of the amplifier. Pulses may be introduced into or abstracted from the loop circuit at any convenient point, the output being shown in Fig. 1 at 18 as a matter of convenience.

Pulses appearing in the circuit traverse expander 14, are sharpened through the action of the expander in providing greater amplification for large amplitude signals than for small amplitude signals and pass to the input of amplifier 10 through a device 16 identified as a frequency restrictive circuit. This frequency restrictive circuit actually represents the frequency characteristics of all of the remaining elements in the loop, including the amplifier, expander and delay line, plus any frequency restrictive circuit which it is desired to introduce for purposes which will be considered below. In the frequency restrictive circuit, the higher frequency components are attenuated to some extent and the remaining frequency components recombined to form an output pulse which is longer than the input pulse. This output pulse is amplified and inverted in amplifier 10 and is reapplied after a delay introduced by unit 12 to the input of expander 14 to reinitiate the cycle. The total delay in the loop is made equal to the desired interpulse interval while the amplifier is given sufficient gain to compensate for the attenuation introduced in the loop.

It will be observed that the action of the expander 14 is in opposition to that of the frequency restrictive circuit 16. The effect of the frequency restrictive element will be more pronounced upon sharp pulses than upon broad ones, thus tending to stabilize the pulse length upon repeated traversals of the loop. Very long pulses will be sharpened by the expander and relatively unaffected by the frequency restrictive element while conversely very sharp pulses are relatively unaffected by the expander but are relatively broadened by the frequency restrictive circuit.

Since the pulse is amplified during each traversal, it is necessary to stabilize the ultimate pulse amplitude by the use of some form of gain control. An automatic gain control circuit is shown by way of example at 20 in Fig. 1 as applied to the expander. Such automatic gain control may be equally well applied to the amplifier.

The nature of the pulses which may be circulated in a loop circuit of this type depends upon the frequency characteristics of the circuit. If the frequency characteristic, as determined either by the inherent frequency limitations of the various elements or by the introduction of a separate filter is essentially that of a low-pass filter, so-called direct current pulses will circulate. If, on the other hand, the above-mentioned frequency characteristic is that of a high-pass filter, radio frequency pulses will circulate in the circuit.

Although in the discussion of the block diagram given above, it is assumed that a pulse is applied from an external source to initiate operation of the circuit, the circuit may be self-starting. Thus, if the circuit is suddenly actuated in the absence of external signals, as for example, by the application of operating potentials to the amplifier and expander circuits, the automatic gain control will operate to set the gain at a value greater than unity. Accordingly, thermal noise voltages will be amplified and applied to the expander. The expander operation is such as to accentuate the highest noise peak by effectively amplifying this peak to a greater extent than the lower noise peaks and upon repeated traversal of the loop, this accentuated pulse or peak will be regenerated and eventually override all other noise components present. This regenerative action will continue until the normal peak pulse ampltiude is reached at which time the automatic gain control will come into operation to prevent any further increase in the amplitude of the circulating pulse.

Since the expander allows more gain for the highest noise peak than for any other noise peak, one peak will always be preferred over the others. If by chance the initial noise voltages should include two impulses having exactly the same amplitude, additional noise occurring during the pulse build-up period will result in one of the two equal peaks becoming infinitesimally larger than the other so that it will be preferred on subsequent traversals.

Should it be desired, however, the automatic gain control may be made fast acting so that the gain of the loop may be changed between pulses. Under these conditions, more than one pulse may be initiated and stably maintained, and in fact as many as five separate sets of pulses have been shown experimentally as traveling simultaneously in a regenerative pulse circuit of this type.

As has been pointed out, circuits may be provided for the circulation of so-called direct current or radio frequency pulses. In addition, the feedback circuit may take any of a variety of forms. It may, for example, and as indicated in the block diagram of Fig. 1, include an actual loop circuit wherein the output of the amplifier is connected physically to the input thereof by a continuous circuit which includes the other elements of the apparatus. Alternatively, a reflex type of circuit may be employed wherein the output of the amplifier is applied to a transmission line and reflected therefrom to the input of the amplifier. Specific examples of both loop and reflex circuits for the production of direct current pulses are illustrated in Figs. 2, 3 and 4, while corresponding circuits for use in the generation of radio frequency pulses are illustrated in Figs. 5 and 7.

Figure 2:
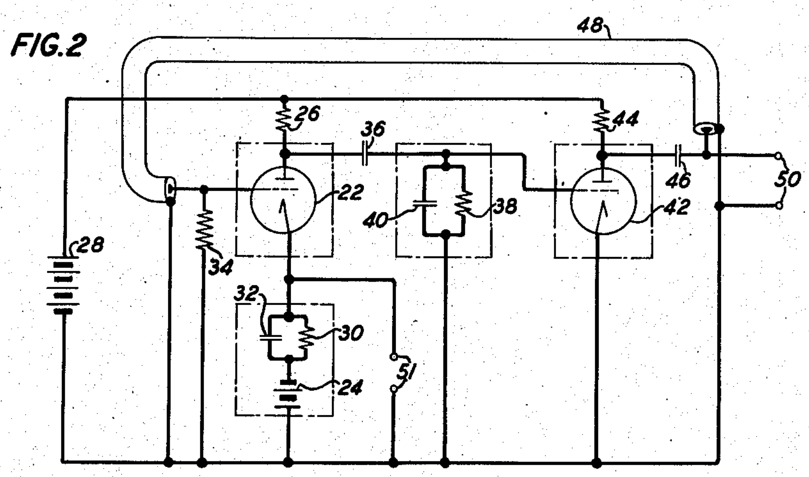
Fig. 2 is a schematic circuit diagram of the circuit shown in Fig. 1.
Figure 3:
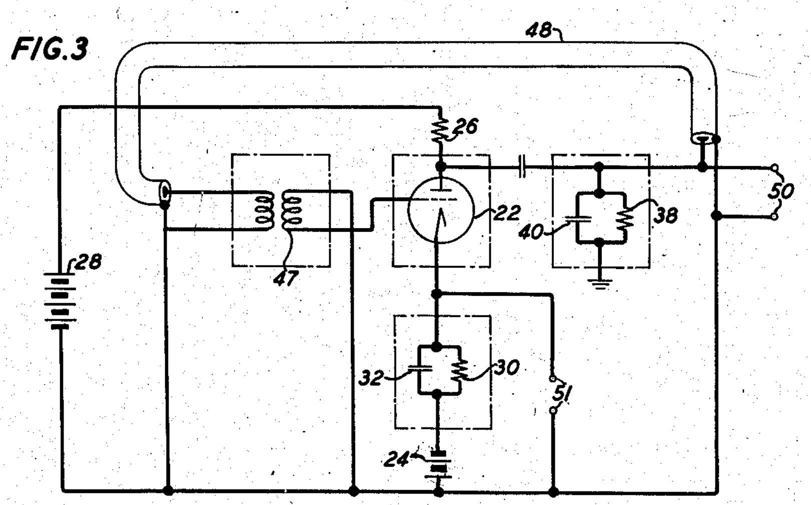
Fig. 3 is a schematic circuit diagram of a modification of the circuit of Fig. 2 employing a reduced number of vacuum tubes.

A specific circuit corresponding to the block diagram of Fig. 1 and arranged for the circulation of direct current pulses is illustrated in Fig. 2. Here the desired expander characteristic is obtained by using a conventional vacuum tube amplifier comprising a triode type tube 22 arranged to operate as either a class B or class C amplifier through the application of a bias potential from a battery 24 and resistor 30 connected in the cathode circuit of the tube. The anode of this tube is connected through an anode resistor 26 to a source of positive potential shown as a battery 28, while the cathode is connected through cathode-resistor 30 and bias battery 24 to the negative terminal of battery 28. The cathode-resistor 30 is by-passed by a capacitor 32 to provide automatic gain control action as will be explained hereinafter. Inasmuch as cathode resistor 30 effectively biases the control grid negatively, bias battery 24 is poled to balance out a major portion of the bias potential to obtain the proper operating conditions. The grid of vacuum tube 22 is returned through resistor 34 to the negative terminal of anode battery 28.

The output of expander-amplifier 22 is coupled through a capacitor 36 to a frequency restrictive element shown herein as comprising a resistor 38 and a capacitor 40 connected in parallel between the output of the expander and the negative terminal of battery 28. Actually, resistor 38 represents all of the shunt resistances and capacitor 40 represents all of the shunt capacitances found in the interstage circuits of the system.

The output pulses from expander 22 are applied to the control grid of a second amplifier comprising a triode tube 42 which is operated at zero bias, the cathode of the tube being connected directly to the negative terminal of battery 28 and the anode of the tube being connected through a resistor 44 to the positive terminal of that battery. The output of amplifier 42 is connected through a capacitor 46 to the input of a delay line 48 which may, for example, comprise a length of solid dielectric coaxial cable, the other end of which is connected to the control grid of expander-amplifier 22.

In considering the operation of this circuit, let it be assumed that a positive pulse is applied to the grid of expander-amplifier 22. Such an applied pulse is sharpened by the expander action of the amplifier and is inverted upon its appearance in the anode circuit of the amplifier. This sharpened and inverted pulse is broadened somewhat by the action of the frequency restrictive elements of the interstage circuit and is applied to amplifier 42. This amplifier reinverts the pulse which is then applied through delay line 48 to the input of the expander, the electrical length of the delay line being sufficient to introduce a delay corresponding to the interpulse interval for the desired pulse repetition rate. Resistor 30 and capacitor 32 connected in the cathode circuit of expander-amplifier 22 provide the requisite automatic gain control action to permit the initial building up of pulses in the absence of applied pulses and to stabilize the amplitude of the circulating pulses. The time constant of the parallel combination of these elements is comparable with the pulse interval. Thus, if the signal traversing loop circuit should increase above the desired peak pulse amplitude the average current through resistor 30 is increased causing a corresponding increase in the magnitude of positive bias voltage at the cathode and a consequent reduction in the peak gain of expander-amplifier 22, and thus a reduction in the amplitude of succeeding pulses. Conversely, a decrease in pulse amplitude reduces the magnitude of this bias voltage and increases the peak gain, thus tending to increase the pulse amplitude. Since the time constant of the cathode circuit is made comparable to the interpulse interval at the desired pulse repetition rate the automatic gain control taken in conjunction with the expander prevents the circulation of more than one pulse simultaneously in the circuit.

A regenerative pulse generator of the type illustrated in Fig. 2 and employing conventional low voltage lumped circuit elements, has been successfully operated to produce pulses of $5 \times 10^{-9}$ seconds duration at the half-voltage points and at a pulse repetition rate of 20 megacycles per second.

Fig. 3 illustrates a modification of the circuit of Fig. 2 wherein the amplification required to compensate for losses in pulse amplitude is furnished by the expander-amplifier tube. Corresponding circuit elements in Figs. 2 and 3 are given like reference characters. In this case, however, the necessary phase relation between the output and the input of amplifier 22 is obtained through the use of a transformer 47 connected between the output of delay line 48 and the control grid of expander-amplifier 22.

In the circuits of Figs. 2 and 3, output terminals have been indicated at 50 and additional terminals are indicated at 51 to furnish one possible point at which a synchronizing signal may be applied to control the operation of the circuit in synchronism with some external source. The manner of synchronization will be considered hereinafter.

Fig. 4 illustrates a direct current regenerative pulsing circuit of the reflex type. A triode type vacuum tube 52 is connected in a class B or C amplifier circuit as in the circuits of Figs. 2 and 3. The output of the amplifier is applied through a coupling capacitor 54 and a short section of delay line 56 to the input of a delay line 58, the frequency restrictive elements of the circuit being represented as comprising a resistor 60 and a capacitor 62 connected in shunt with the output of expander-amplifier 52. Pulses from the amplifier traverse delay line 58, and are reflected and inverted by an impedance discontinuity indicated at 64. The pulses, thus returned to the input of the delay line 58, appear on the control grid of the expander-amplifier 52 in the proper phase to reinitiate the cycle of operation. The total delay introduced by the round trip traversals of the pulse in delay lines 56 and 58 is chosen to be equal to the desired interpulse interval. Delay line 56 which is effectively connected between the anode and control grid of expander-amplifier 52 is provided to prevent short-circuiting of the amplifier during the pulses. Thus, a positive pulse applied to the control grid of expander-amplifier 52 will overcome the net bias furnished by resistor 68 and battery 66 and produce a negative pulse in the output circuit. This negative pulse traverses coupling capacitor 54 and delay line 56 and is applied to delay line 58. At this time, the negative pulse also appears at the control grid of expander-amplifier 52 but has no significant effect since, during the delay interval provided by delay line 56, the tube has been returned to the cut-off condition. The negative pulse applied to delay line 58 is totally reflected and inverted at the termination of the line and returns to the control grid of the expander-amplifier 52 to again drive the grid positive and reinstitute the operating cycle. The cathode circuit of the amplifier includes the parallel combination of a resistor 68 and a capacitor 70 which operates to provide automatic gain control action, as in the case of the circuits of Figs. 2 and 3. Also as in the circuits of Figs. 2 and 3, terminals 50 may be used as output terminals while synchronizing signals may be applied to terminals 51.

As has been pointed out above, the regenerative pulse generator of the invention may be used for the production of radio frequency pulses if the frequency restrictive elements of the circuit are such as to correspond to a high-pass filter. A circuit for operation at a pulse repetition rate of approximately 4,000 megacycles per second is illustrated in Fig. 5, wherein amplification is provided by a traveling wave amplifier tube 72 shown schematically as including a cathode 74, a control grid 76, a helix 78 and a target anode 80. Traveling wave amplifiers are described in articles in Proceedings of the IRE for February 1947 entitled "Traveling-Wave Tubes" by J. R. Pierce and L. M. Field at page 108; "Theory of the Beam-Type Traveling-Wave Tube" by J. R. Pierce at page 111; and "The Traveling Wave Tube as an Amplifier at Microwaves" by R. Kompfner at page 124.

In the present circuit the expander comprises a wave guide hybrid junction 82, two conjugate arms of which comprise input and output circuits and the remaining conjugate arms of which include crystal rectifiers 84 and 86, these latter arms being one-quarter wave different in length as indicated in the drawing. This type of expander forms the subject-matter of my copending application, Serial No. 118,890, filed on even date herewith. As pointed out in that application, if the crystals 84 and 86 are matched to the corresponding arms of the hybrid junction for low amplitude input signals, an expander characteristic may be obtained since signals of progressively greater amplitudes are more completely reflected by the progressively increasing mismatch between the crystals and the arms in which they are mounted. Since the expander has a limited band width, a band-pass filter comprising irises 88 and 90 appropriately spaced in the wave guide is inserted in the circulating pulse path. The pulses from the expander are applied to the input coupling circuit of the traveling wave amplifier. The output of the amplifier is applied through a wave guide hybrid junction 89 to a transmission line 92 through which the pulses are reapplied to the input of the expander 82 after a desired delay. As in the case of the direct current pulse circuit heretofore described, the effect of the band-pass filter 88, 90 is essentially to broaden the pulse applied to the input of the expander which again sharpens the pulse so that the pulse length is stabilized by their combined action. Automatic gain control action for the purpose of stabilizing the pulse amplitude at a desired peak pulse level is accomplished by the provision of a time constant circuit comprising a resistor 94 and a capacitor 96 connected in parallel in the direct current path of rectifiers 84 and 86. Thus, the rectifier impedances which vary with the unidirectional current therethrough and consequently the expander action of the expander 82 vary at a rate determined by the time constant circuit which limits the rate at which the rectifier impedance may change. Useful output of the pulse generator may be taken from branch 98 of wave guide hybrid junction 89.

The diagrams of Fig. 6 illustrate the wave forms of the pulses upon traversal of the various elements of the circuit of Fig. 5. Thus, Fig. 6*a* shows a typical radio frequency pulse which may exist in the circuit. This pulse is acted upon by expander 82, the characteristic of which is shown in Fig. 6*b*. As a result of this action, the radio frequency pulse of Fig. 6*a* is sharpened, giving a pulse envelope as shown in Fig. 6*c*. Upon traversal of the band-pass filter 88, 90, the characteristic of which is shown in Fig. 6*d*, the pulse is broadened and appears at the input of the expander with an envelope shown in Fig. 6*e*. In the stable equilibrium condition, the effect of the expander is balanced against that of the band-pass filter and the envelopes of the stabilized pulses will be substantially as shown in Fig. 6*a*.

A reflex radio frequency pulse generator, corresponding to the direct current pulse generator of Fig. 4, is illustrated in Fig. 7. In this circuit expansion is obtained by reflecting the pulses directly from a crystal rectifier 100 mounted in a section of wave guide 102. Rectifier 100 is matched to the wave guide at low amplitude levels and consequently provides expansion as in the system of Fig. 5. The direct current circuit of the crystal includes a time constant circuit 104 operating in the same manner as the time constant circuit 90, 96 of Fig. 5 to provide automatic gain control by restricting the rate at which the impedance of rectifier 100 varies as the result of self-rectification of the applied pulses. The pulses reflected from crystal 100 are applied through a band-pass filter 106 to a traveling wave amplifier 108 which must have a low loss. The output of the amplifier is applied to a wave guide hybrid junction 110. There the amplified pulse is divided, half being directed to output 112 and half to the input of a delay line 114. The energy reflected from the far end of the delay line returns to the junction where it is again divided, half being dissipated in termination 118 and the other half traversing traveling wave amplifier tube 108 in the reverse direction by way of the helix and without amplification to the expander-rectifier 100 to reinstitute the cycle.

As has been pointed out above, the regenerative pulse circuits of the invention may be operated in synchronism with signals from an external source. Thus, and depending upon the nature of the applied synchronizing signal, either the pulse repetition rate, the center frequency of the pulses or both may be synchronized. (A radio frequency pulse may be considered as a spectrum of individual continuous wave signals which may be expressed by Fourier analysis to give the shape of the pulse envelope. The term "instantaneous frequency" is the reciprocal of the time between corresponding parts of a single radio frequency cycle in the pulse. "Center frequency" indicates the mean frequency of the Fourier spectrum which may or may not be the same as any single component or the instantaneous frequency.)

Figures 8A, 8B, 8C:
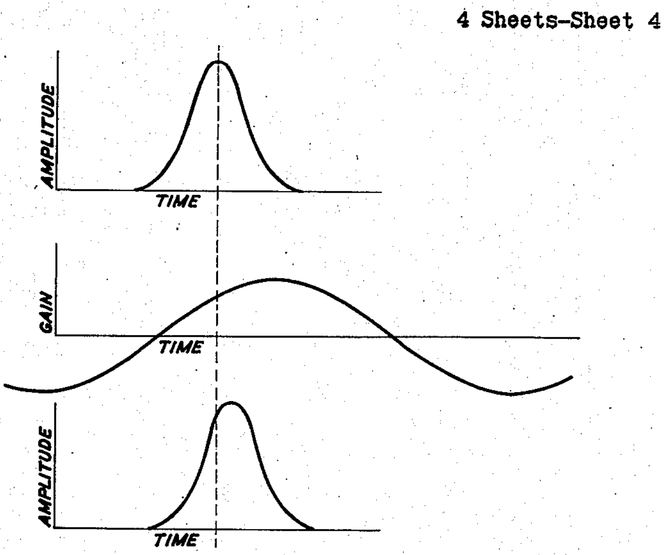

The synchronizing voltage may be applied at any convenient point in the regenerative pulse circuit. As an example, the output of a synchronizing oscillator 21 is shown in Fig. 1 as being applied to expander 14. If the applied synchronizing voltage is a sinusoidal or a pulse voltage corresponding to the desired repetition rate and is near the natural period determined by the circuit delay of the generator, the repetition rate may be modified sufficiently to provide for synchronization. This action is shown for a pulse generator with a sinusoidal synchronizing signal in Figs. 8*a*–8*c*. Thus, the curve of Fig. 8*a* illustrates either a direct current pulse or the envelope of a radio frequency pulse circulating in a regenerative pulse generator according to the invention. The curve of Fig. 8*b* which is drawn on the same time scale indicates a single half-cycle of the synchronizing signal and thus shows the variation of circuit gain produced by the synchronizing signal. This variation in circuit gain results in a delay as may be shown by summation of curves 8*a* and 8*b* (in the illustration chosen), in the time of occurrence of the circulating pulse as illustrated by Fig. 8*c* also drawn on the same time scale as Fig. 8*a*. Since each pulse traversing the loop will be similarly retarded with respect to the preceding one by the action of a synchronizing voltage having the relative phase indicated in Figs. 8*a* and 8*b*, the result is a decrease in the pulse repetition rate which tends to shift the time of the pulse peak into coincidence with the peak of the synchronizing voltage. It is obvious that if the relative phase of the circulating pulse and synchronizing voltages were such as to cause the circulating pulse to coincide with the downward slope of the synchronizing voltage, the pulse rate would be increased again to move the circulating pulse into coincidence with the peak of the synchronizing signal. In this manner any departure from coincidence between the circulating pulse and the synchronizing signal tends to produce an effect which acts to restore the pulse time and therefore the pulse rate to that of the synchronizing voltage. The synchronizing voltage may be applied to terminals 51 as indicated in Figs. 2, 3 and 4. Similarly, the repetition rate of the radio frequency pulses circulated in the circuits of Figs. 5 and 6 may be synchronized with signals applied, for example, to the expander circuit through terminals 95.

Figure 9A:
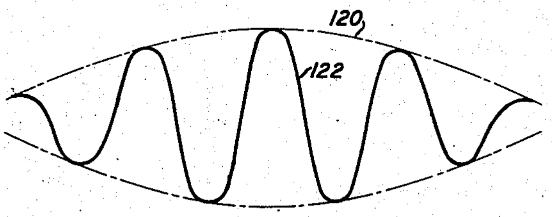
Figure 9B:
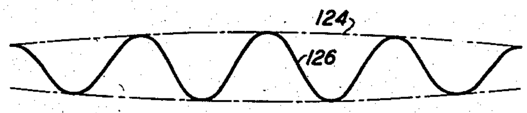
Figure 9C:
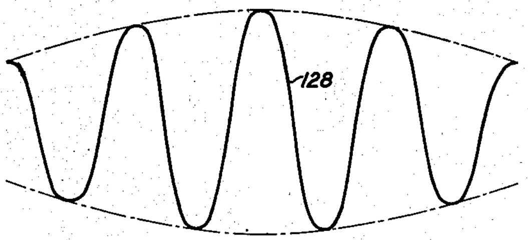
Figure 9D:
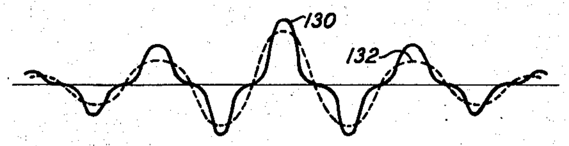

In a similar fashion, the center frequency of a radio frequency pulse may be synchronized with a low level continuous wave radio frequency signal applied to the circulating pulse generator. If a radio frequency pulse such as is shown in Fig. 9*a*, comprising a radio frequency wave 122 is subjected to the action of a synchronizing wave 126 with a pulse envelope 124, both the repetition rate or frequency and the center frequency may be controlled. Such a synchronizing signal may be applied to the circuits of Figs. 5 and 7 from a pulsed radio frequency oscillator indicated at 91. Thus, in Fig. 5, for example, termination 99 is removed from the hybrid junction and the oscillator is connected through a wave guide to that arm of the junction. In Fig. 7, a similar wave guide connection is made between oscillator 91 and the hybrid junction, termination 118 being removed for this purpose. Curve 9*c* shows the sum of the pulses of Figs. 9*a* and 9*b* and it is apparent that the peak of the envelope of radio frequency wave 128 has been shifted toward the peak of the envelope 124 of the synchronizing signal. Intermodulation of the two radio frequency waves occurs as a result of the non-linear expander characteristic of the circulating pulse circuit and produces a radio frequency wave of the general shape shown by the solid curve 130 of Fig. 9*d*. The fundamental component of this radio frequency wave after removal of harmonics by the frequency restrictive characteristic of the circulating pulse circuit is illustrated by the dashed line 132 of Fig. 9*d*. It will be noted that both the pulse envelope and the peaks of the radio frequency wave of the dashed line curve of Fig. 9*d* have been shifted toward synchronism with the corresponding curves of the synchronizing signal of Fig. 9*b*.

What is claimed is:

1. Apparatus for producing pulses of desired characteristics comprising a feedback amplifier arranged to reapply the output thereof to the input in the same phase, the feedback circuit including means for introducing a total delay equal to the desired pulse interval said circuit having a frequency restrictive characteristic and an expander arranged to compensate for the frequency restrictive characteristic of said feedback circuit, and means for controlling the over-all gain of said amplifier to provide unity amplification for pulses of the desired peak amplitude.

2. Apparatus for producing pulses of desired repetition rate and amplitude comprising a feedback amplifier, the feedback loop of which includes means introducing a total delay equal to the desired pulse interval said feedback loop introducing a frequency restrictive characteristic and an expander, the characteristic of which is complementary to the frequency restrictive characteristic of the remainder of the circuit, and means providing automatic gain control action for said amplifier to maintain the desired pulse amplitude.

3. Apparatus for producing pulses of desired characteristics comprising an amplifier, a circuit for reapplying output signals from said amplifier to the input thereof in identical polarity, said circuit including a delay line of length to make the round-trip delay equal to the desired pulse interval said circuit having a frequency restrictive characteristic and an expander for compensating for the frequency resrictive characteristic of the remainder of the circuit, means for maintaining the over-all round-trip gain of the apparatus at unity for the desired peak pulse amplitude, and means for controlling the repetition rate in accordance with an external signal.

4. Apparatus for producing pulses of desired characteristics comprising an amplifier, a circuit for reapplying output signals from said amplifier to the input thereof in identical polarity, said circuit including a delay line of length to make the round-trip delay equal to the desired pulse interval said circuit having a frequency restrictive characteristic and an expander for compensating for the frequency restrictive characteristic of the remainder of the circuit, means for maintaining the over-all round-trip gain of the apparatus at unity for the desired peak pulse amplitude, and means for controlling the repetition rate of the pulses in said circuit in accordance with an external signal, said means comprising a source of periodic voltage of the desired repetition rate, and means for applying it to said amplifier to vary the gain thereof.

5. Apparatus for producing pulses of desired characteristics comprising an amplifier, a loop circuit for reapplying output signals from said amplifier to the input thereof in identical polarity, said circuit including a delay line of length to make the round-trip delay equal to the desired pulse interval said circuit having a frequency restrictive characteristic and an expander for compensating for the frequency restrictive characteristic of the remainder of the circuit, means for maintaining the over-all round-trip gain of the apparatus at unity for the desired peak pulse amplitude, and apparatus for controlling the center frequency of the pulses traversing said circuit comprising a source of radio frequency oscillations of frequency equal to the desired center frequency, and means for introducing said oscillations into said loop circuit.

6. Apparatus for producing pulses of desired characteristics comprising an amplifier, a loop circuit for reapplying output signals from said amplifier to the input thereof in identical polarity, said circuit including a delay line of length to make the round-trip delay equal to the desired pulse interval said circuit having a frequency restrictive characteristic and an expander for compensating for the frequency restrictive characteristic of the remainder of the circuit, means for maintaining the over-all round-trip gain of the apparatus at unity for the desired peak pulse amplitude, means for controlling both the pulse repetition rate and the center frequency of the pulses in said circuit comprising an external source of radio frequency energy of the desired center frequency and pulsed at the desired repetition rate, and means for introducing said pulses of radio frequency energy into said loop circuit.

7. Apparatus for producing pulses of desired characteristics comprising an amplifier, a transmission line having input terminals connected to both the input and the output of said amplifier, means terminating said transmission line to reflect the output of said amplifier to the input thereof after a delay equal to the desired pulse interval the transmission line circuit introducing a frequency restrictive characteristic, means for providing said amplifier with an expander characteristic, and means for maintaining the over-all gain of said amplifier at unity for the desired peak pulse amplitude.

8. Apparatus for producing pulses of desired characteristics comprising an amplifier, a transmission line circuit at the output thereof, means for reflecting energy incident upon said transmission line back to the input thereof, a return path from the input of said transmission line to the input of said amplifier said circuit and return path having a frequency restrictive characteristic, means for disabling said return path during the production of a pulse by said amplifier, means for providing said amplifier with an expander characteristic, and an automatic gain control circuit to maintain the over-all gain of said amplifier at unity for the desired peak pulse amplitude.

9. Apparatus for producing pulses of desired characteristics comprising an amplifier, a circuit for reapplying output signals therefrom in phase to the input thereof including a delay line of electrical length equal to the desired pulse interval said circuit having a frequency restrictive characteristic, and an expander arranged to compensate for the frequency restrictive characteristic of the remainder of said circuit, means for maintaining the gain of said amplifier at unity for the desired peak pulse amplitude, and means for controlling the repetition rate of said pulses in accordance with an external signal which comprise a source of said external signals and means for applying said external signals to said expander periodically to vary the expansion characteristic thereof.

10. Apparatus for producing pulses of desired characteristics comprising an amplifier, means for causing said amplifier to operate with an expander characteristic, means for inverting the phase of the output signal of said amplifier and reapplying said signal to the input of said amplifier after a time delay equal to the desired pulse interval, and means for maintaining the over-all round-trip gain of the apparatus at unity for the desired peak pulse amplitude.

11. Apparatus for producing radio frequency pulses at a desired repetition rate comprising a traveling wave amplifier and a circuit for applying output signals therefrom to the input thereof after a total time delay equal to the pulse interval for the desired repetition rate, said circuit including a delay line of electrical length equal to the desired pulse interval and a wave guide hybrid junction, one pair of conjugate arms which is included in said feedback circuit and the other pair of conjugate arms of which include crystal rectifiers arranged to provide an expander characteristic and an external time constant circuit associated with said crystal rectifiers to vary the expander characteristic in such a way as to provide automatic gain control for said loop circuit.

12. Apparatus for producing radio frequency pulses of desired repetition rate comprising a traveling wave amplifier, means at the output thereof for reflecting output pulses therefrom, back through the amplifier after a total delay equal to the pulse interval corresponding to the desired repetition rate, means associated with the input circuit of said amplifier for reflecting said reflected pulses back to the input, said last-mentioned reflecting means including a wave guide section having a crystal rectifier mounted therein, and an external time constant circuit including said crystal rectifier for varying the expander characteristic provided thereby for the purpose of introducing automatic gain control in said circuit.

CASSIUS C. CUTLER.

REFERENCES CITED

The following references are of record in the file of this patent:

UNITED STATES PATENTS

| Number | Name | Date |
|---|---|---|
| 2,016,427 | Green | Oct. 8, 1935 |
| 2,266,531 | Bedford | Dec. 16, 1941 |
| 2,429,227 | Herbst | Oct. 21, 1947 |
| 2,471,408 | Busignies | May 31, 1949 |
| 2,482,974 | Gordon | Sept. 27, 1949 |
| 2,551,348 | Lunstein | May 1, 1951 |

OTHER REFERENCES

Averbach et al., "Mercury Delay Line Memory Using a Pulse Rate of Several Megacycles," Proc. I. R. E. vol. 37, No. 8, August 1949—pages 856–861.

Sharpless, "Design of Mercury Delay Lines," Electronics, November 1947—pages 134–138.